Jan. 14, 1930. F. L. ARENSBERG ET AL 1,743,803
REFRACTORY STRUCTURE AND ARTICLE AND METHOD OF FORMING THE SAME
Filed Aug. 21, 1928
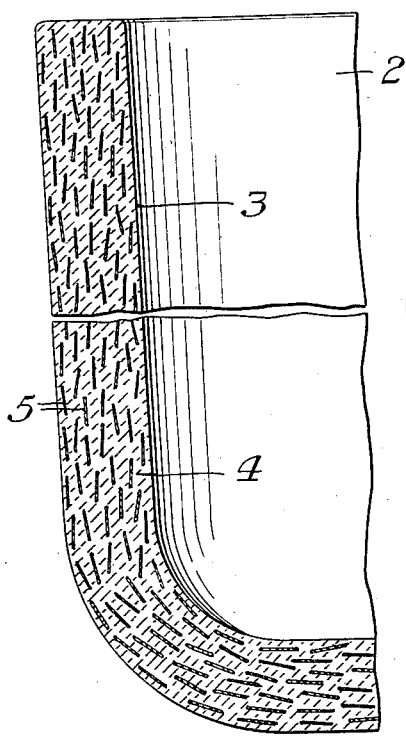
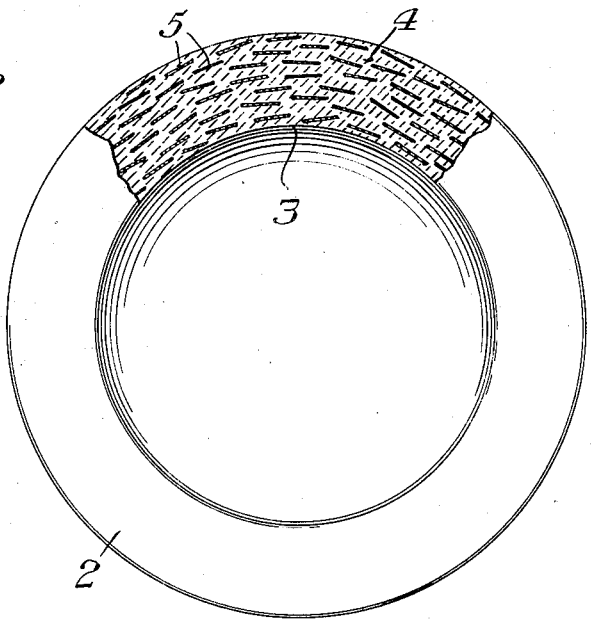
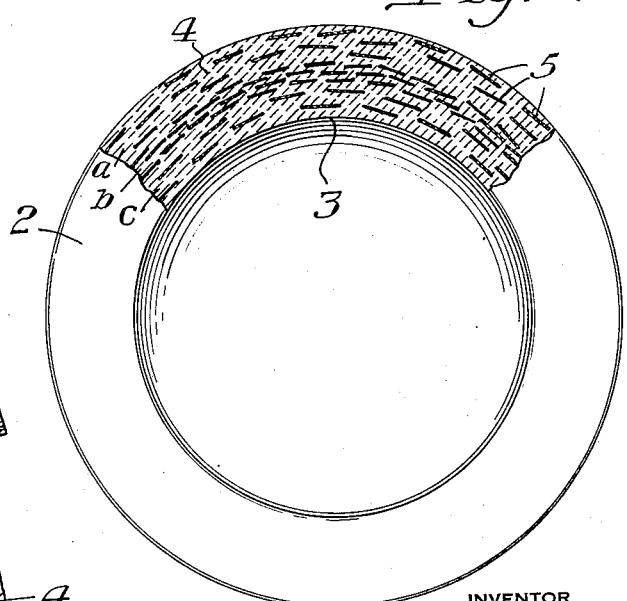
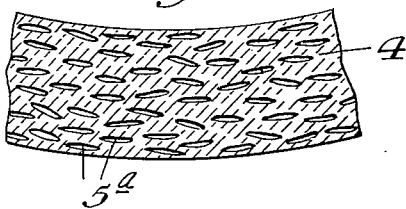
INVENTOR
Francis L. Arensberg
Arthur J. Jackman
Charles L. Jones
By Byrnes, Stebbins & Parmelee
Their Attys.

Patented Jan. 14, 1930

1,743,803

UNITED STATES PATENT OFFICE

FRANCIS L. ARENSBERG, OF PITTSBURGH, ARTHUR J. JACKMAN, OF FOREST HILLS, AND CHARLES L. JONES, OF PITTSBURGH, PENNSYLVANIA, ASSIGNORS TO VESUVIUS CRUCIBLE COMPANY, OF SWISSVALE, PENNSYLVANIA, A CORPORATION OF PENNSYLVANIA

REFRACTORY STRUCTURE AND ARTICLE AND METHOD OF FORMING THE SAME

Application filed August 21, 1928. Serial No. 301,002.

This invention relates to a refractory structure and article and a method of forming the same. It relates more particularly to a refractory structure adapted to withstand high temperatures and adapted for the manufacture of large sized crucibles.

It is well known in the ceramic art that the porosity of a ceramic body bears a definite relation to its resistance to thermal shock. It is a general rule that, considering bodies of similar composition, the greater the porosity the greater will be the resistance to thermal shock. It is thus possible by making articles having a high degree of porosity to obtain extremely good resistance to thermal shock.

The problem of the present invention was that of making relatively thin crucibles of large size free from carbon and suitable for melting steel. This problem was not susceptible of a satisfactory solution by means heretofore known in the ceramic art.

The problem is concerned more particularly with the manufacture of crucibles for use in coreless induction furnaces for melting steel. Such crucibles are used by placing them in the center of a primary coil through which an electric current is passed, the matter to be melted being placed in the crucible and heated by the current induced therein. In the usual practice with such crucibles there are extreme temperature differences between different portions of a crucible. The top edge, for instance, is very much cooler than the portion of the crucible in closest proximity with the primary coil while the center of the bottom is very much cooler than the outer portions of the bottom, owing to differences in distance from the primary coil and consequent differences in intensity of the field and magnitude of induced current.

Numerous materials have been used in the making of large sized crucibles for melting steel in such furnaces. These include magnesia, fused alumina, cyanite, mullite, fire clay, chrome, diaspore, zircon and others. Generally crucibles made of such materials and being larger than about 10 inches in diameter have been found to crack within the first two or three heats. The single exception in this regard is thin fused silica, the coefficient of expansion of which is low enough to avoid cracking. Fused silica, however, is not a commercially desirable material on account of its fragility and its very low resistance to the attack of basic slags.

The only commercial solution which has heretofore been found for the problem to which we have addressed ourselves is a compromise. Crucibles of refractory material chosen for its suitability on chemical grounds are used, backed up with a suitable refractory sand. The crucibles will crack and dependence is placed upon the backing sand to retain the metal and protect the primary coil. It is apparent that such a practice is a poor substitute for a carbon-free non-cracking crucible.

We have at the same time solved the problems above mentioned and produced a refractory material or structure which possesses superior properties for many other uses. We provide a highly porous material having pores of definitely controlled size, shape and orientation.

We adapt well-known refractory materials such as chrome ore, magnesite and the like to use in large sized induction furnace crucibles by increasing their normal resistance to thermal shock. This may be done to a certain extent within the scope of principles well-known in the ceramic art by increasing the porosity of the materials generally. This may be done either by controlling the grind and burn or by incorporating an organic material such, for instance, as sawdust, into the green material when formed and then burning out the organic material prior to use. High porosities produced by the above methods, however, only result in permeabilities so high that slag readily penetrates the material, fills the pores and destroys its resilience, or result in making the product so friable that it is unsuited to withstand the abrasion of metal charging.

We make use of oxidizable or organic material of flat, flaky, or lamellar character such as bran, flat seeds or fish scales. Such material is mixed with the refractory substance prior to the forming of the article, is then preferably arranged or oriented so that the flat or lamellar particles are generally parallel to one another, and is finally shaped to the desired conformation of the crucible and "burned", whereupon the oxidizable or organic matter is oxidized, leaving the flat or lamellar oriented pores characteristic of our invention.

In the accompanying drawings we have shown certain present preferred embodiments of the invention wherein Figure 1 is a vertical cross section through a portion of a crucible made in accordance with our invention, but before being "burned", and showing the lamellar particles of greatly exaggerated size;

Figure 2 is a horizontal cross section through an "unburned" crucible, similar to that of Figure 1;

Figure 3 is an enlarged fragmentary view of a portion of completely "burned" material formed in accordance with our invention, the pores being of still more greatly exaggerated size than the lamellar particles of Figures 1 and 2;

Figure 4 is a horizontal cross section through a modified form of crucible "unburned", and Figure 5 is a view similar to Figure 3 but showing a structure in which a different oxidizable or organic material has been used.

Referring more particularly to the drawings, reference numeral 2 designates generally a crucible having a wall 3. The wall is comprised of refractory material 4 having therein substantially lamellar oriented particles 5. When such particles 5 are "burned" out, as will be presently described, substantially lamellar pores 5ᵃ are formed in the refractory material 4.

The material formed in accordance with our invention has a very great resistance to thermal shock by reason of its flexibility. The pores being substantially parallel, the thin laminæ of material in the structure are also substantially parallel and therefore have the tendency of making the material more springy, resilient or flexible than if the pores were of substantially spherical shape. This property of our material will be apparent from the drawings.

If a crucible formed in accordance with our invention is placed in a furnace and heated suddenly and unevenly so that the inner layers are caused to expand while the temperature of the outer layers remains unchanged, it will be seen that if the number of flat or substantially lamellar pores and their distance apart is properly related to the material of the crucible, the expansion of the inner layers will be taken up by the resilience or flexibility of the structure itself and it will be impossible to transmit sufficient force to the outer layers of the material to cause failure.

We have mentioned above certain types of lamellar material or grog that may be used. We do not, however, wish to be limited to any particular material for this purpose as it is burned out in the manufacture of the material or crucible, the shape of the pore being the essential factor. We have found fish scales to be particularly convenient to use since they are a waste product available at very moderate cost and since the scales from fish of a given genus are of substantially uniform size and thickness.

We have also employed bran, seeds, paper confetti and the like, the choice of the material being for the most part a question of cost, availability and the particular size and shape of pores desired.

The proportions of refractory material and grog which will give the best results under various circumstances of course depend upon the various factors to be taken into consideration. The optimum size and percentage of pores required depends not only on the refractory body itself but on the size, shape and thickness of the piece to be made and the severity of the expected service from the point of view of thermal shock. An excessive percentage of pores will not substantially injure the resistance to thermal shock but it is considered undesirable because excessive porosity weakens the body and renders it friable. By making our materials of relatively impermeable substances we can further produce articles having maximum porosity but at the same time minimum permeability.

As an example of the proportions in which the ingredients may be mixed according to our invention, we may employ a mixture of 70 parts of refractory material, which may be a ball clay, such as English Dorset clay, together with 30 parts of felspar or an appropriate amount of flux to produce a dense body in the portions of the fired ware surrounding the pores. This mixture is preferably blunged and then mixed with sufficient bran or small fish scales to give a porosity in the finished ware of 40 to 60 percent. The material thus produced is then formed into hollow articles by jiggering. The articles may be flat as well as hollow and may be formed by pressing or casting, but in any case the technique of the forming operation must be worked out by trial and error to orient the pores substantially as described above. This orientation is perhaps less difficult to obtain by jiggering than by the other methods mentioned. The article is then fired to oxidize the grog and the firing continues in accord with the usual practice to mature and vitrify the structure. As a general rule, the higher the firing temperature short of severe over-burning, the more impervious and stronger will be the finished ware. The resilience imparted to the ware according to our invention makes it possible to fire the ware much more rapidly without dunting or cracking than similar wares not possessing the same structural qualities. Articles 1 inch in thickness have been burned from room temperature to 2700° F. and cooled to room temperature within five hours without cracking.

While we have herein referred to a refractory material it is to be understood that the invention in its broadest aspect contemplates rather a structure than a material,—that is, an arrangement of the particles of the material in a particular manner. The structure may be formed or developed in any suitable material, such as those above mentioned. When lack of plasticity of the material necessitates the use of pressing or casting in place of jiggering these methods or any others giving the desired result may be employed.

Figures 3 and 5 are necessarily somewhat diagrammatic but the showing of Figure 5 is intended to illustrate pores formed of flat or lamellar seeds whereas Figure 3 is intended to illustrate pores formed by using fish scales.

Figure 4 illustrates an embodiment of the invention which is preferred in cases where a lamellar structure throughout of optimum porosity provides a body too permeable or too friable to withstand the abrasion and slag action to which its surface may be subjected. In such cases the structure is cast or jiggered in successive layers of two or more different mixes. In Figure 4 only three layers $a$, $b$, and $c$ are shown but more or less may be employed. The layers forming the surfaces of the article may or may not contain flat or lamellar pores as herein disclosed but one or more layers containing an ample proportion of such pores must be included. Thus in Figure 3, layers $a$ and $c$ may or may not contain lamellar pores but the inclusion of an ample number of such pores in layer $b$ imparts resilience to the article and makes the article as a whole behave as though layers $a$ and $c$ were separate thin structures separated by the cushioning layer $b$.

The properties of the finished structure are dependent upon the relative thickness and length of the refractory laminæ left between the pores. This will be readily understood by considering the properties of a material such, for instance, as glass, which is quite brittle when formed in thick sheets but which when spun into thin fibers or sheets may be bent, twisted and even woven into fabrics. The average thickness and size of the dividing walls between two lamellar pores in a structure according to the present invention depends upon the size of the lamellar grog and also its percentage in the mix—an increased percentage giving thinner dividing walls. In a vitrified material these walls are glassy in nature and can actually be visibly bent without breaking when made sufficiently thin.

While we have shown and described certain present preferred embodiments of the invention, it is to be understood that the same is not limited thereto but may be otherwise embodied and practiced within the scope of the following claims.

We claim:—

1. A refractory structure having a predominance of pores of substantially less width than their breadth and depth.

2. A refractory structure having a predominance of substantially flat pores.

3. A flexible porous refractory structure the pores of which have their greatest dimension extending substantially in the direction thereof.

4. A refractory structure having a predominance of substantially lamellar pores.

5. A refractory structure having a predominance of substantially lamellar pores arranged generally parallel to the surface thereof.

6. A refractory structure of at least twenty percent porosity the pores of which are predominantly flat in character.

7. A refractory article adapted to withstand high temperatures having a predominance of substantially flat pores arranged generally parallel to the surfaces of the article whereby to increase its flexibility.

8. A refractory article adapted to withstand high temperatures having a predominance of substantially lamellar pores.

9. A substance for use in making refractory articles comprising refractory material and substantially flat pieces of combustible material.

10. A substance for use in making refractory articles comprising refractory material and substantially lamellar particles of combustible material.

11. A substance for use in making refractory articles comprising refractory material and substantially flat particles of organic material.

12. A substance for use in making refractory articles comprising refractory material having therein substantially lamellar particles of combustible material arranged generally parallel to the surface thereof.

13. A method of forming a refractory structure comprising mixing a refractory substance with substantially lamellar particles of oxidizable material and thereafter oxidizing such particles.

14. A method of forming a refractory structure comprising mixing a refractory substance with substantially lamellar particles of oxidizable material, arranging such particles in substantially parallel relation and oxidizing the particles.

15. A refractory structure comprising a portion having substantially lamellar pores and a substantially parallel portion having a relatively greater number of substantially lamellar pores.

16. A refractory structure comprising alternating layers having respectively a greater and a less lamellar porosity.

17. A refractory article having a generally lamellar porous structure, successive layers of the article having different degrees of porosity.

In testimony whereof we have hereunto set our hands.

FRANCIS L. ARENSBERG.
ARTHUR J. JACKMAN.
CHARLES L. JONES.